(No Model.)  7 Sheets—Sheet 1.

A. LEVEDAHL.
MACHINE FOR MAKING AND APPLYING PERIPHERALLY TOOTHED SPOKE WASHERS.

No. 595,107.  Patented Dec. 7, 1897.

Fig. 1.

Witnesses:
Inventor
Axel Levedahl
By Poole & Brown Attys (No Model.) 7 Sheets—Sheet 2.

A. LEVEDAHL.
MACHINE FOR MAKING AND APPLYING PERIPHERALLY TOOTHED SPOKE WASHERS.

No. 595,107. Patented Dec. 7, 1897.

(No Model.) 7 Sheets—Sheet 3.

A. LEVEDAHL.
MACHINE FOR MAKING AND APPLYING PERIPHERALLY TOOTHED SPOKE WASHERS.

No. 595,107. Patented Dec. 7, 1897.

(No Model.) 7 Sheets—Sheet 5.

A. LEVEDAHL.
MACHINE FOR MAKING AND APPLYING PERIPHERALLY TOOTHED SPOKE WASHERS.

No. 595,107. Patented Dec. 7, 1897.

Witnesses:
B. Weir
Harold E. Barrett

Inventor,
Axel Levedahl
By Poole & Brown
Attys (No Model.) 7 Sheets—Sheet 6.

A. LEVEDAHL.
MACHINE FOR MAKING AND APPLYING PERIPHERALLY TOOTHED SPOKE WASHERS.

No. 595,107. Patented Dec. 7, 1897.

Witnesses:
J B Weir
Harold G Barrett

Inventor,
Axel Levedahl
By Poole & Brown Attys

UNITED STATES PATENT OFFICE.

AXEL LEVEDAHL, OF AURORA, ILLINOIS, ASSIGNOR TO THE AURORA AUTOMATIC MACHINERY COMPANY, OF SAME PLACE.

MACHINE FOR MAKING AND APPLYING PERIPHERALLY-TOOTHED SPOKE-WASHERS.

SPECIFICATION forming part of Letters Patent No. 595,107, dated December 7, 1897.

Application filed June 7, 1897. Serial No. 639,755. (No model.)

*To all whom it may concern:*

Be it known that I, AXEL LEVEDAHL, of Aurora, in the county of Kane and State of Illinois, have invented certain new and useful Improvements in Machines for Making and Applying Peripherally-Toothed Spoke-Washers; and I do hereby declare that the following is a full, clear, and exact description thereof, reference being had to the accompanying drawings, and to the letters of reference marked thereon, which form a part of this specification.

This invention relates to a machine intended for forming and applying to wooden bicycle-wheel rims metal spoke-washers of that kind having peripheral projections or prongs which enter the wood of the rim to hold the washers in place and to prevent the splitting of the rim.

The invention consists in the matters hereinafter described, and pointed out in the appended claims.

In carrying out my invention it is my purpose to form the spoke-washers from a metal strip by the action of suitable dies and to apply the washers to the rims one by one as they are shaped or formed and severed from the strip. To secure these ends, it is my purpose to employ a machine having main parts or features as follows, namely: a feeding device for the metal blank or strip by which the same shall be advanced to the operative parts of the machine by which the washers are formed, punching and forming dies adapted to act upon the strip to give shape to the washers before the same are completely severed therefrom, and means for finally severing the washer from the blank strip and pressing or applying the same upon or to the wooden rim.

In a separate application for Letters Patent, Serial No. 639,756, filed June 7, 1897, I have shown and described a machine for applying washers having spurs located within the outer edge or margin of the washers, said machine being in many respects like the one herein shown, which latter differs from that of said separate application by being adapted to form and apply washers having peripheral teeth or prongs.

In the drawings, Fig. 3 is an enlarged detail section taken through the main operative parts of the machine on line 3 3 of Fig. 4.

The machine illustrated has the general form of a die-press, the same comprising a cast-metal frame A, having a die-supporting bed or table A' and an overhanging part or arm A² above the same provided with vertical guides A³ A³, in which is mounted a vertically-sliding die-carrying head or plunger B, which is given vertical reciprocating motion from a crank-shaft C, mounted at the top of the frame by means of a connecting-rod or pitman B'. The machine-frame also embraces a lower supporting part or standard $A^4$, by which the die-supporting bed or table $A'$ is sustained at an elevation above the floor convenient for the operator who attends to the machine.

The operative parts of the machine consist principally of upper movable and lower stationary punching and forming dies which operate on the blank strip to form the washers and feed mechanism by which the strip is advanced step by step to the dies.

Before entering upon a detailed description of these parts of the apparatus it may first be stated that the several pairs of punching and forming dies operate at the same time on the blank to perform different steps in giving shape to the washers, so that a plurality of steps in such operation are accomplished at each downward movement of the reciprocating head or plunger of the machine, the opposing pairs of punches and dies being arranged in a straight line at equal or uniform distances apart, so that at each advance movement of the blank strip the same will be acted upon successively by the devices which perform the several steps in the process. Moreover, the feed mechanism is arranged to operate in conjunction with the movements of the head or plunger to advance the strip an equal distance at each stroke of the plunger, so as to feed the parts of the blank being operated upon successively to the several forming devices.

Figures 8, 16, 17, 18, 19, 22, 23:
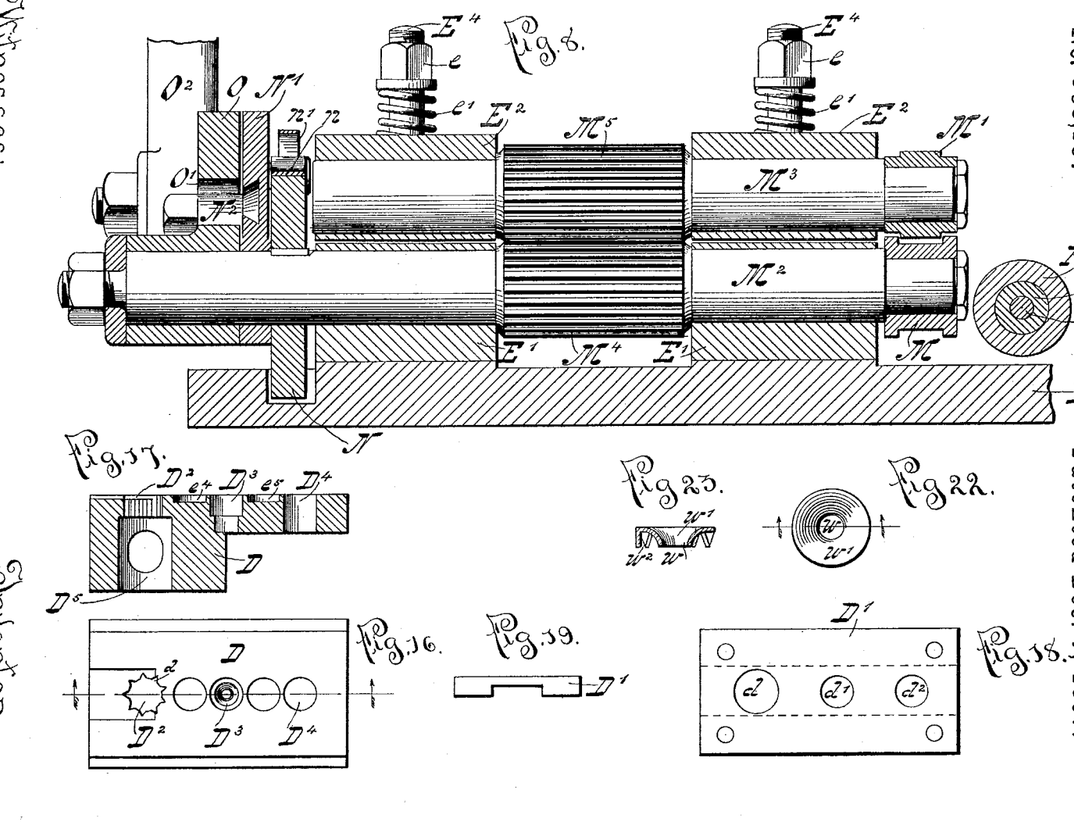
Fig. 8 is a detail sectional view taken longitudinally through the feed-rollers and parts which operate the same on lines 6 6 of Fig. 4.
Fig. 16 is a detail plan view of the die-plate.
Fig. 17 is a central section of the same.
Fig. 18 is a detail plan view of the die-plate cap.
Fig. 19 is an end view of the same.
Figs. 22 and 23 are face and side views of a finished washer made by the machine.

The construction of the washer to be made by the machine and the steps by which the washer is formed are as follows:

Referring now to the washer itself, which is shown at W in Figs. 22 and 23, the same is of circular form, having a central hole $w$ for the spoke and a central recess or depression $w'$ concentric with the hole to receive the spoke-head. Projecting from the margin of the washer are a plurality of peripheral points, teeth, or spurs $w^2$, formed by cutting radial outwardly-projecting tongues on the periphery of the blank which forms the washer and bending said tongues at right angles with the face of the same. In the process of making these washers the central hole is first punched in the blanks and in the same operation marginal tongues are formed and the disk which forms the washer partially severed from the sheet-metal blank strip, spaces between the teeth being left uncut. In the act of forming the outwardly-projecting prongs or teeth the same are bent downwardly at right angles to the blank, such cutting and bending of the prongs being accomplished by a properly-shaped punch acting in connection with a cutting and bending die.

Figures 5, 21:
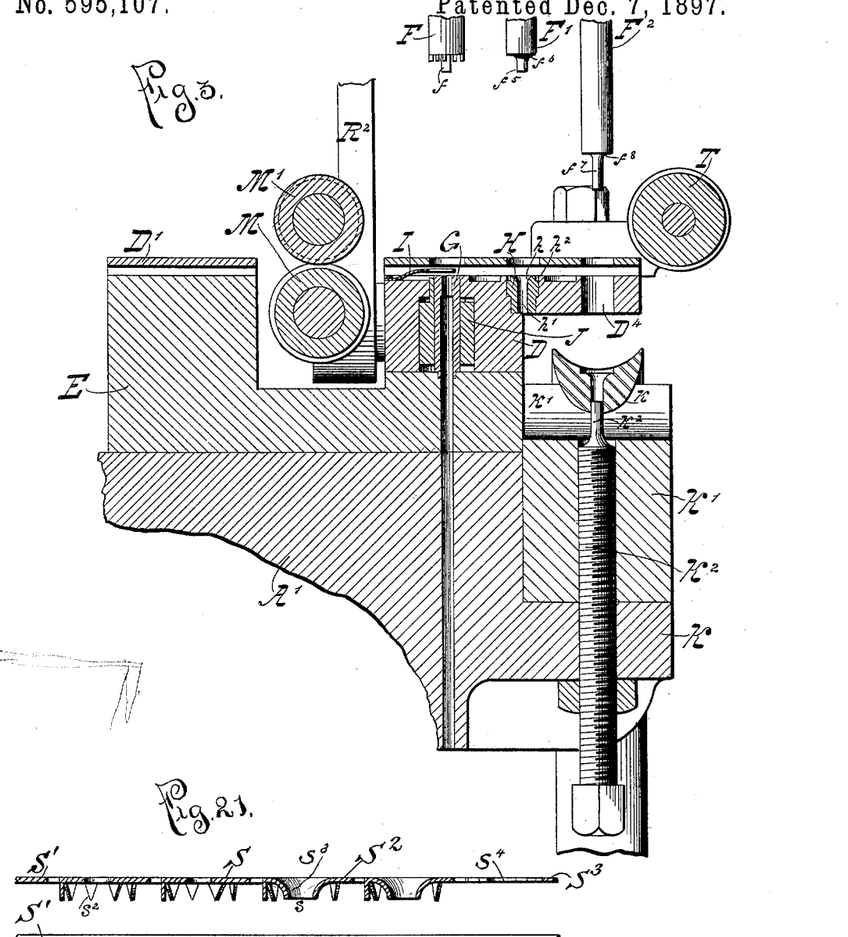
Fig. 5 is a detail view of the same parts shown in front elevation.
Fig. 21 is a longitudinal section of the same.
Figure 5:
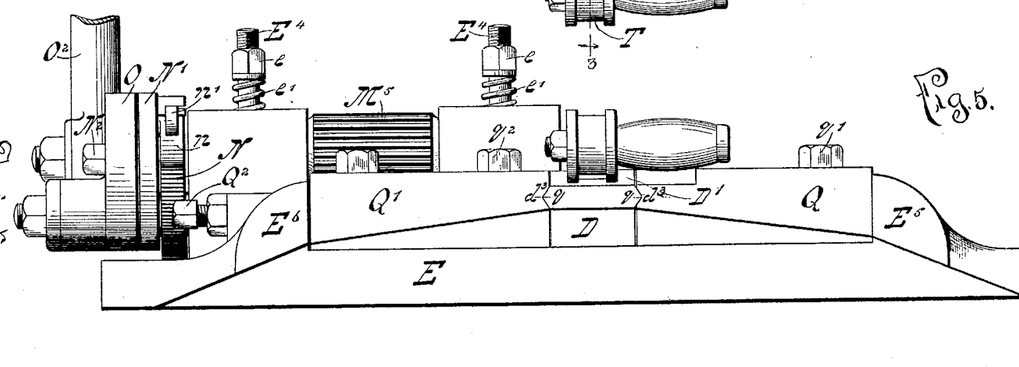
Figure 6:
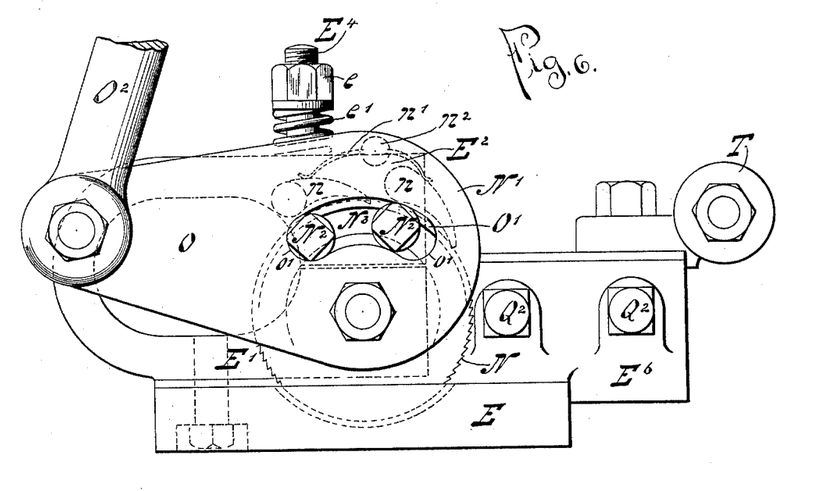
Fig. 6 is an enlarged detail view of the parts which operate the feed-roller as seen from the side of the machine.
Figure 7:
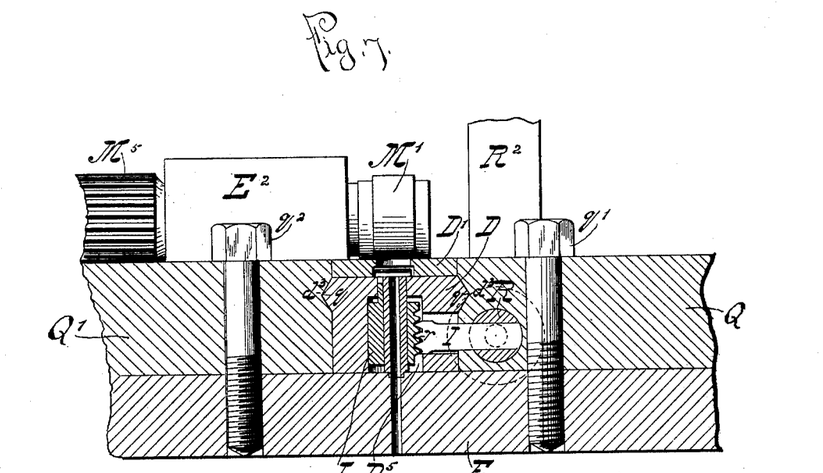
Fig. 7 is a detail cross-section taken through the opposing dies which act first on the strip taken on line 7 7 of Fig. 4.
Figure 20:
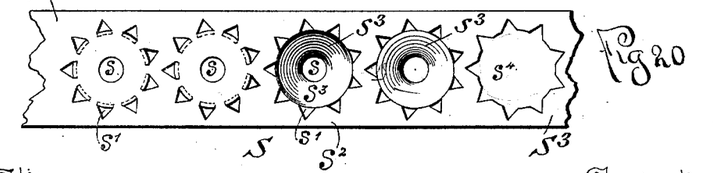
Fig. 20 is a face view of the strip, showing the several steps in the formation of a washer.

Referring to Figs. 20 and 21, which show the blank strip and illustrate the several steps in the formation of the washer, S indicates the said strip; $s$, the center hole, which is first punched therein; $s'$, triangular openings in the strip, and $s^2$ prongs which have been punched from the said openings and bent outwardly at right angles with the face of the strip, these features being located at the part $S'$ of the strip which is first acted upon by the machine. At $S^2$ is shown the part of the strip which has been acted upon by the forming-dies to give the central depression or cup shape to the blank, $s^3$ indicating the said depression. At $S^3$ is shown the part of the blank at which has taken place the third operation, which is that of punching out the metal between the bases of the teeth, a round hole $s^4$ with serrated edges being left where the washer has been punched out by the cutting-die.

Now, referring to the upper and lower punching and forming dies by which the operations above referred to are performed, these parts in the construction illustrated in the drawings are made as follows: D indicates a die-plate which is mounted on the table $A'$, but which is directly sustained or supported by means of a supporting-plate E, said plate E being secured at the top of the table $A'$ and the die-plate being arranged to overhang the front edge of the same and to afford space beneath it for the placing of the rim in position to receive the completed washers as fast as formed. Over said die is located a cap-plate $D'$, provided on its under surface with a groove which forms with the top surface of the die-plate a horizontal passage for the blank strip, said passage extending in a direction longitudinally of the die-plate and from the rear toward the front of the machine. In the said cap-plate $D'$ are formed three holes $d$ $d'$ $d^2$ for the passage of the movable upper dies or punches F $F'$ $F^2$, which are secured in the reciprocating head or plunger $B'$ above the die-plate D and are arranged in a straight row from the rear to the front of the machine and at equal distances apart. In the die-plate D, below the cap-plate $D'$, are formed three openings or apertures $D^2$ $D^3$ $D^4$, which are arranged beneath and in axial alinement with the punches F $F'$ $F^2$. The punch F operates in connection with the notched or serrated edge of the hole $D^2$ in punching out the prongs and coöperates with a lower circular bending-die G, arranged in the aperture $D^2$ to form the central hole in the blank and to bend downwardly the said prongs. The punch $F'$ is a forming-punch and coöperates with a forming-die H, which is inserted in the opening $D^3$ of the die-plate. The punch $F^2$ is a circular cutting-punch to sever the margin of the washer from the blank strip between the teeth and it coöperates with the aperture $D^4$ of the die-plate, which aperture is circular and cylindric in form and is adapted to fit the circular punch.

Figures 9, 10, 11, 12, 13, 14, 15:
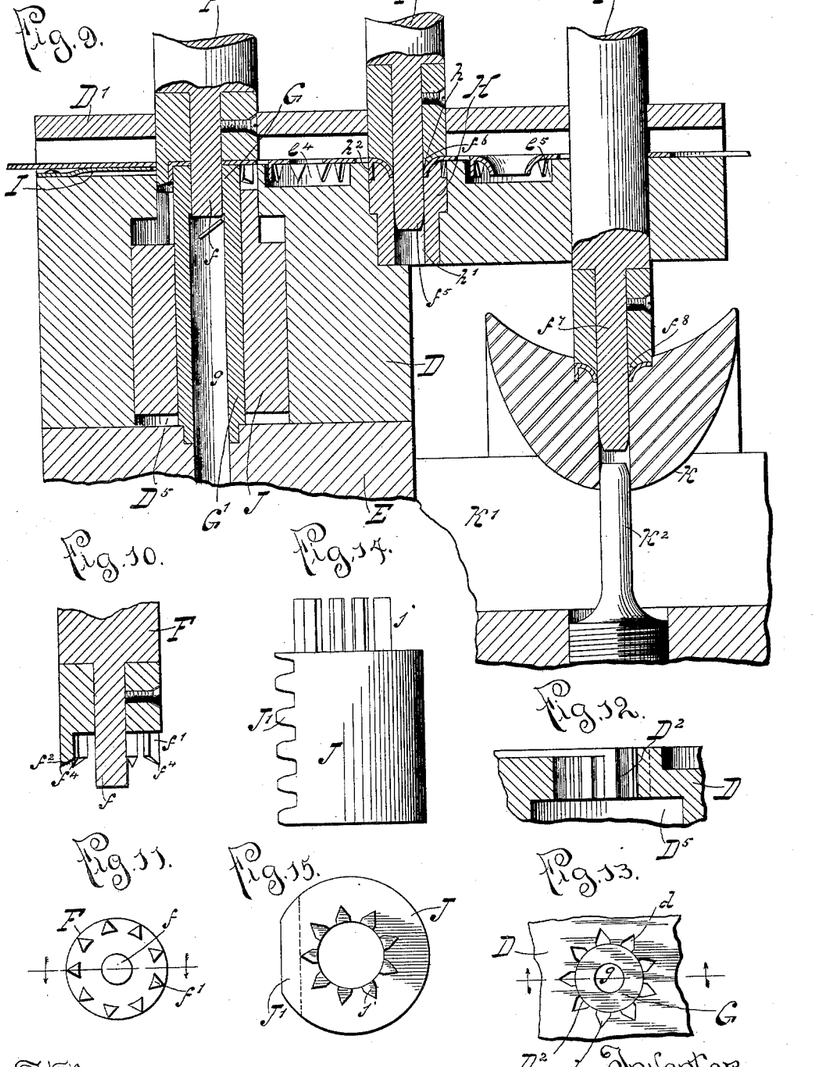
Fig. 9 is an enlarged detail section through the several punching and forming dies, showing the same when operating upon the metal strip and after the finished washer has been punched from said strip.
Fig. 10 is a detail section of the upper punch by which the teeth on the washer are formed.
Fig. 11 is an end view of the same.
Fig. 12 is a detail side view of the lower die which coacts with said punch.
Fig. 13 is a plan view showing the upper end of the same.
Fig. 14 is a side view of the blank-lifter.
Fig. 15 is a top or end view of the same.

Referring more in detail to the punch F and its opposing die G, said punch is provided with a central concentric projection or pin $f$, adapted for punching out the central hole in the blank and coacting with a central hole $g$ in the lower die G. Said punch F is also provided with a plurality of annularly-arranged triangular projections or punching-prongs $f'$, separated from each other and from the central pin $f$ and having cutting edges $f^2 f^2$ at the angles formed between their end surfaces and outer inclined faces, Figs. 10 and 11. The extremities of said punching-prongs $f'$ are beveled or inclined downwardly and outwardly, Fig. 10, so that the inclined end faces of the prongs intersect the oblique faces $f^2$ thereof to form salient points $f^4$, which first enter the blank in the act of cutting or punching. The margin of the hole $D^2$ is provided with vertical parallel grooves $d\ d$, adapted to coact with the outer or cutting edges of the prongs $f\ f'$. The die G, Figs. 12 and 13, is adapted to fit within the hole $D^2$ of the die-plate and extends downwardly to and is attached to the plate E, the lower part $G'$ of said die being made of tubular form and inserted at its lower end in a socket in the said plate, which latter is provided with a passage which forms a continuation of the hollow interior of the die to permit the escape of fragments punched from the blanks. Said die G is made cylindric at its upper end and forms with the grooves $d\ d$ in the die-plate an annular series of recesses adapted to receive the punching-prongs $f'$. The outer edges of the prongs $f'$ and the edges of said recesses (formed by the grooves $d$) sever the metal of the blank, and the external radius of the die G is so much less than that of the radial distance of the inner faces of the prongs $f$ from the center of the punch F as to provide spaces equal to the thickness of the metal being punched between the inner faces of the punching-prongs and the outer edge of the said die G, said outer edge of the die and the inner edge of the punching-prongs forming bending and not cutting dies. It follows that after the angular cuts have been made to sever the free ends of the prongs from the blank strip said prongs will be bent downwardly into the grooves $d$ and over the edge of the die G by the action of said punching-prongs $f'$. This operation of the parts is clearly illustrated in Fig. 9, which shows the opposing dies and blank during the operation of punching.

In view of the fact that the prongs of the blank are bent downwardly into the recesses of the lower die as the first step in the operation it is necessary, in order to permit the forward feeding of the blank strip after the said teeth are formed, to lift the blank strip to an extent sufficient to permit the teeth to clear the surface of the die in their forward movement. The guide-passage for the blank will be sufficiently deep to permit the passage of the strip therethrough after the prongs have been bent downwardly thereon, and an upwardly-pressing spring I is located in the said passage with its free end adjacent to the die G, said spring tending to hold or press the blank strip against the cap-plate $D'$, so that it will be depressed into contact with the lower die G only during the cutting or punching operation. Such spring will ordinarily serve the purpose of lifting the strip, so as to release the teeth from the holes in the die-plate as the upper punch F rises; but in order to make certain that the blank strip shall in every instance be lifted before the feeding device moves to advance the strip I have provided a positively-actuated lifting device adapted to act on the blank, as follows: J is a tubular block located in a guide-passage $D^5$, which is formed in the die-plate below and concentric with the opening $D^2$, said block being arranged to slide upon the lower part $G'$ of the die G. Said part $G'$ is extended through the recess $D^5$ and secured in the supporting-plate at the bottom of said recess, as above stated. The block J is provided at its upper end with a plurality of vertical, parallel, triangular, annularly-arranged lifting prongs or teeth $j$, that fit and slide within the grooves $d$ of the die-plate D, and the said block J is adapted for vertical movement, so that the teeth $j$ may be thrust or carried upwardly above the top of the die G to act on the downwardly-bent prongs or teeth and thereby lift the blank strip after the punching operation has been completed, it being of course understood that the teeth $j$ will be withdrawn so far below the top of the die-plate when the punch F descends as to prevent interference with the punching and bending operation hereinbefore described. The devices for actuating the blank-lifting teeth and their supporting-block will be hereinafter described.

Now referring to the forming-punch $F'$ and die H said forming-punch is provided with a central guide-opening $f^5$ and a projection or boss $f^6$, which coöperates with a correspondingly-shaped recess $h$ in the die H, said die H having a central passage $h'$ for the guide-pin $f^5$. Around the top margin of the said die H is formed a groove or rabbet $h^2$, which forms with the side of the opening $D^3$ in the die-block a groove to receive the prongs or teeth of the blank strip at the time the said blank strip is depressed into contact with the lower die H in the operation of the punch $F'$ thereon. It will be understood from the above that after the punching-dies F and G have operated upon the blank strip the latter is fed forward far enough to carry the punched holes in the blank centrally over the die H, so that in the next descent of the head B with the several punches the forming-punch $F'$ will act to give cup shape to the central part of the washer at the same that the punch F and die G act upon a new part of the blank strip.

Now referring to the punch $F^2$ said punch, as before stated, is a circular punch which operates in connection with the opening $D^4$ in the die-plate to detach the margin of the washer from the blank strip between the teeth thereon, such detachment finishing or completing the washer and leaving it in readiness for attachment to the rim. Said punch $F^2$ is made of a diameter practically equal to that of the die G and is shown as provided with a central guide-pin $f^7$, and inasmuch as the punch operates not only to cut the washer from the blank but also to force it into its seat in the wooden rim the punch is provided also with a concentric projection $f^8$, which fits within the central recess of the washer and thereby avoids possibility of distortion of the washer under the pressure of the punch, which might occur if the punch were arranged to act upon the margin of the recessed washer only.

Devices for supporting the wheel-rims, for feeding the blank strips, and other features of the machine illustrated are like those shown in said separate application and are made as follows: For supporting the rim beneath the outer part of the die-plate and in position to receive the finished washer which is carried downwardly through the die-plate and against its seat in the rim a support or anvil is provided, said anvil having, preferably, the form of a bracket K, projecting forwardly from the table A' beneath the overhanging plate D and the die-plate supported thereby. The upper part of said anvil consists of a wooden block K', having a grooved top surface provided with a central guide-groove $k$, in which the lower convex surface of the rim rests. At the center of the bracket K is preferably formed a transverse groove $k'$, and through the block and the bracket K is inserted a vertical screw-shaft $K^2$, having at its upper end a guide-pin $k^2$, which projects above the top of the block and is adapted to enter the previously-bored spoke-holes in the rim to accurately center the said holes. Said screw-shaft $K^2$ is provided with a head at its lower end and with a jam-nut acting against the bracket K, this construction enabling the guide-pin $k^2$ to be adjusted vertically in accordance with the necessities of the work being done.

Figure 1:
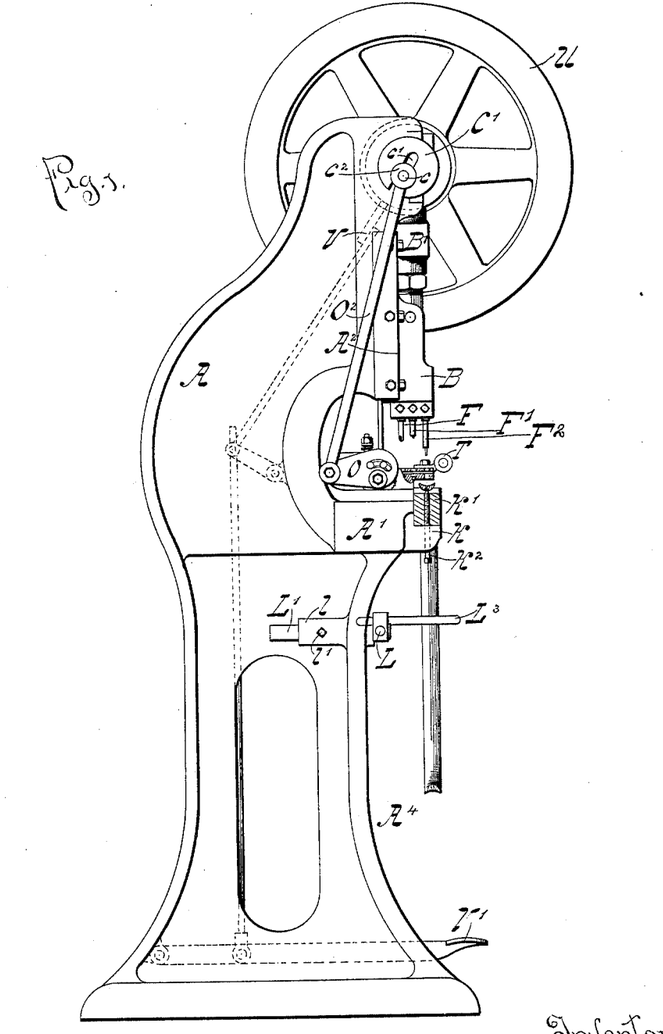
Figure 1 is a side view of a machine embodying the invention.
Figure 2:
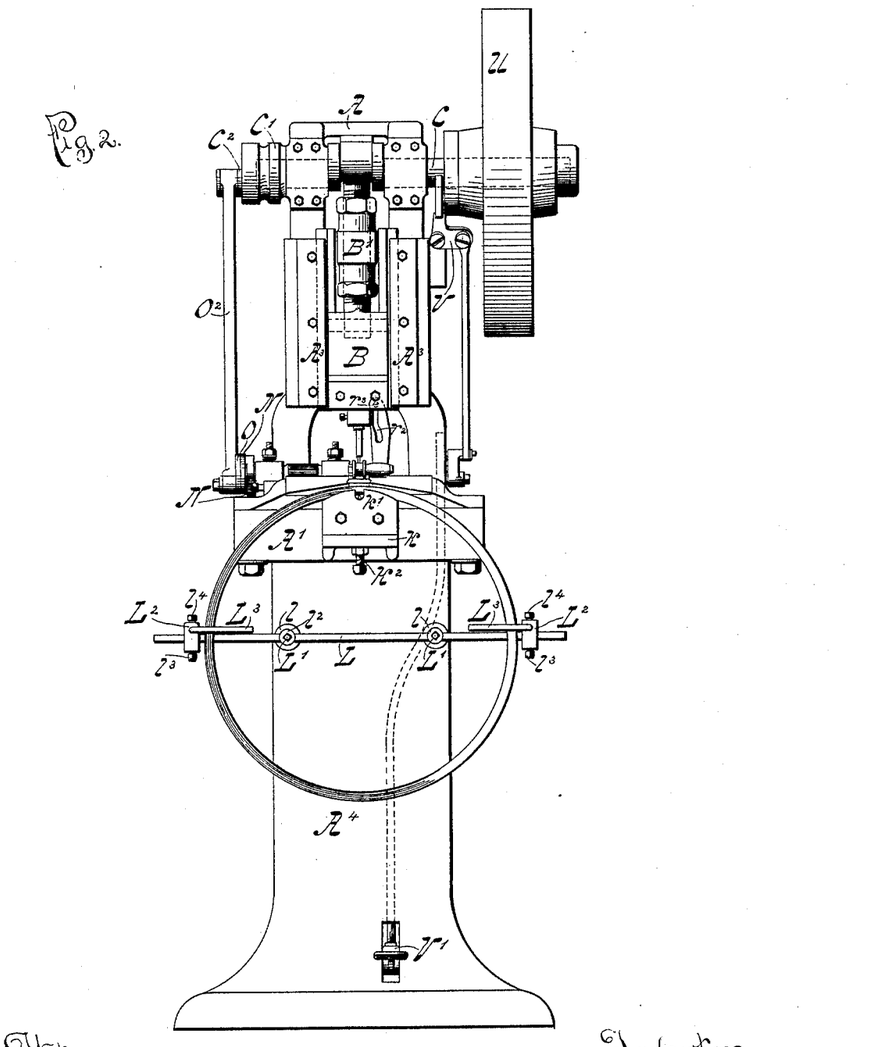
Fig. 2 is a front or face view thereof.

In order to enable the wheel-rim to be accurately placed in the several required positions in the act of applying the washers to the spoke-holes, which are variously inclined for the spreading and tangent spokes, I provide stops or gages, as follows: L is a horizontal rod which extends across the front of the frame-standard $A^4$ beneath the table A' and is attached to the front ends of two horizontally-sliding bars L', which pass through suitable guide-sockets $l$ in the frame and are adjustably held therein by set-screws $l'$, Fig. 1. Said rod is shown as passing through holes in the outer ends of the bars L' and as held therein by set-screws $l^2$. On the outer ends of the rod L are located sliding blocks $L^2 L^2$, provided with set-screws $l^3$, by which the blocks may be adjustably secured to the said rod L'. In the said blocks $L^2$ are inserted L-shaped guide-arms $L^3$, which are adjustably secured to the blocks by set-screws $l^4$, and which extend horizontally outward exterior to the wheel-rim and then inwardly toward the center thereof past said wheel-rim. The outer ends of the rod L, together with the forwardly and laterally extending parts of the arms $L^3$, constitute stops to limit the movement of the lower part of the wheel-rim both backwardly and forwardly and laterally in both directions. The extent of movement of the wheel-rim backwardly and forwardly or laterally may be controlled as desired by adjustment of the said rod L and arms $L^3$.

The operation of applying the finished washer to the rim will be obvious, the operator being required only to move or shift the rim to bring one spoke-hole after another beneath the punch F and to swing the said rim backwardly and forwardly or laterally as the rim is turned, according to the arrangement of the spoke-holes.

The feed devices by which the blank strip is fed to the punching and forming dies are made as follows: M M' are lower and upper feed-rolls which are mounted on shafts $M^2 M^3$, which are arranged horizontally and transversely of the machine and are provided with intermeshing gears $M^4 M^5$, by which the upper is driven from the lower shaft. The lower shaft $M^2$ is mounted in bearing-apertures in bearing-blocks E', which are located at opposite sides of the gear-wheel $M^4$ and bolted to the plate E, preferably by tap-bolts extending through said plate from beneath the same. The upper shaft $M^3$ is mounted in bearing-apertures which are formed in the outer ends of overhanging arms or goosenecks $E^2$, which are cast integral with the blocks E' and are connected with the rear edges of the latter blocks. In order to hold the said feed-rollers together with a yielding or variable pressure, studs $E^4 E^4$ are inserted in the lower bearing-blocks E' and extend upwardly through the upper bearing-arms $E^2$, and said studs are provided on their upper ends with screw-threads and with nuts $e\ e$, between which nuts and the tops of the arms $E^2$ are located spiral springs $e'\ e'$.

Provision is made for giving rotary motion to the lower feed-roller shaft $M^2$ by devices as follows: N is a ratchet-wheel which is rigidly attached to said shaft $M^2$ outside of the outer bearing-block E'. Mounted on the shaft $M^2$, concentric with the said ratchet-wheel, is an oscillating pawl-plate N', which carries two pawls $n\ n$, which are held in contact with the ratchet-wheel by suitably-applied springs, said springs being herein shown as formed by a single spring-plate $n'$, secured at its center to a stud $n^2$, projecting from the pawl-plate N' over the ratchet-wheel. Mounted upon the said shaft, outside of the pawl-plate N', is an oscillating feed-arm O. In the said feed-arm O is formed a curved or segmental slot O', arranged concentric with the pivotal axis of the arm, and in said pawl-plate N' are secured two studs $N^2 N^2$, which project from the outer ends of the pawl-plate into said slots O', said studs being arranged at equal distances from the central axis of the shaft and being located at a distance apart less than the length of the slot O' in the feed-arm. Said studs N² are adjustably secured in the pawl-plate by being inserted through and secured in a concentric slot N³, which slot in the pawl-plate is arranged opposite the slot O' in the oscillating arm. The feed-arm O is given oscillatory movement by suitable driving connections attached to its free end, and its oscillatory movement is transmitted to the pawl-plate N' and the pawls, which are carried backwardly and forwardly along the ratchet-wheel, so as to turn the same through a partial revolution at each stroke of the feed-arm.

The devices shown for actuating the said feed-arm O consist of a crank-disk C' on the crank-shaft of the machine and a connecting-rod O², which engages a crank-pin $c$ in the crank-disk and is pivoted to the end of the said feed-arm.

To afford means for adjusting the throw of the feed-arm, the said crank-disk C' is provided with a transversely-arranged groove $c'$ of T shape, said groove extending inwardly from one edge or face of the disk and being adapted to receive a T-hand on the crank-pin $c$, a clamping-nut C² being applied to the crank-pin to hold the same in position within the said slot. By adjusting the crank-pin inwardly and outwardly in the slot $c'$ the throw of said crank-pin, and consequently the throw of the feed-arm, may be changed or regulated as desired.

To hold the die-plate D in place upon the supporting-plate E, said die-plate is provided at its opposite sides with horizontal ribs or projections $d^3$ $d^5$, and removable holding-plates Q Q' are located upon the plate E at opposite sides of the die-plate, said plates being provided on their adjacent faces with grooves $q$, adapted to receive the ribs $d^3$ of the die-plate. The holding-plate Q at one side of the guide-plate abuts at its outer edge against an integral abutment E⁵ on the plate E and is held in place by tap-bolts $q'$ $q'$. Outside of the plate Q' is an integral abutment E⁶, through which pass two clamping-screws Q² Q³, that act upon the plate Q' to clamp the die-plate firmly in place, said plate Q' being additionally held in place by tap-bolts $q^2$.

Figure 4:
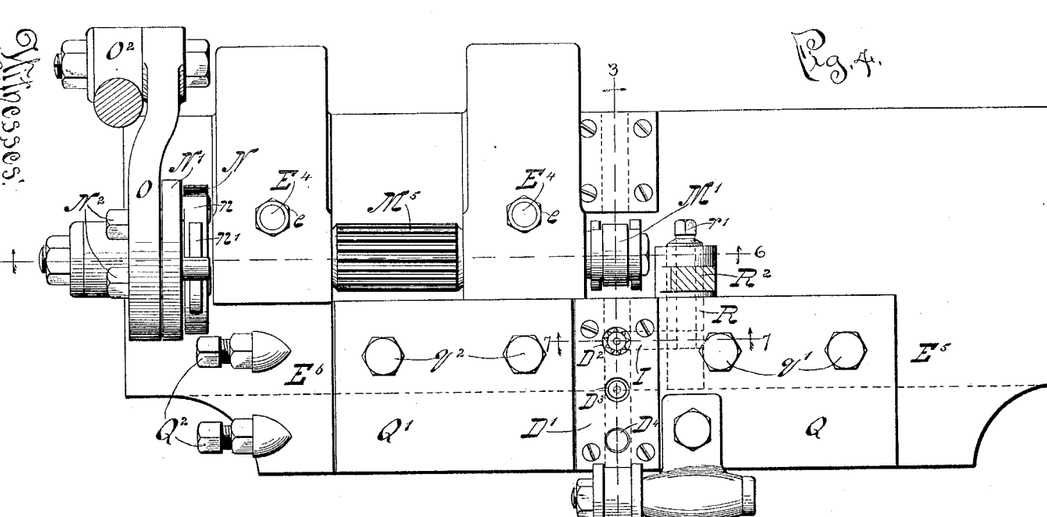
Fig. 4 is a detail plan view, on an enlarged scale, of the operative parts which rest on the bed-plate of the machine.

Referring now to the actuating device for moving the blank-strip lifter J, these parts are made as follows, Fig. 4: R is a rock-shaft which is mounted in a bearing-aperture in the plate Q and is arranged horizontally with its rear end extending past the rear face of said plate. Attached to said rock-shaft is an oscillating arm I, which is provided at its free end with a tooth-segment $r$, which intermeshes with a rack J' on the side of the block J. Said arm I is conveniently secured to the rock-shaft by being inserted through a transverse hole in the same and clamped therein by means of a set-screw $r'$, passing axially through the rock-shaft and projecting from the rear end thereof. Attached to the said rock-shaft and rising therefrom is an actuating-lever R². Said lever extends upwardly at the rear of the sliding head or plunger B and is provided with a cam-slot $r^2$, which is engaged by a stud $r^3$, projecting rearwardly from the said plunger B, said slot being vertical in its upper part and deflected laterally at its lower part, so that the strip-lifter will be drawn downwardly as the plunger descends and will be lifted and held in its elevated position during the time the plunger is rising and again starting in its descent.

The feed devices are arranged to advance the strip a distance equal to one-half of the space between the centers of the forming-dies and plungers at each stroke, and the die-plate is provided with recesses $e^4$ $e^5$, located in alinement with the lower dies to receive the projections or prongs on the blank strip when the latter is depressed at each stroke of the machine.

At the front of the die-plate and above the path of the blank is located a guide-roller T, around which the blank strip is carried after it passes from the dies, said blank strip being wound upon a suitable reel or otherwise disposed of, so that it may be kept out of the way of the operator, who stands in front of the machine to manipulate the wheel-rim to which the washers are being applied.

The machine illustrated is provided with the usual auxiliary attachments, such as a driving and fly wheel U, and a clutch device, (indicated as a whole by V,) which is operated by suitable connections from a foot-lever V'.

I claim as my invention—

1. A machine for making spoke-washers having toothed edges, comprising coacting cutting and bending dies which sever the teeth from the blank and bend said teeth outwardly from the plane of the blank at right angles with the same while leaving the margin of the same connected with the blank between the teeth, a second set of dies consisting of cutting-dies acting to sever the finished washer from the blank between the teeth, and means for intermittingly feeding the blank to advance the same from the first to the second set of dies.

2. A machine for making and applying spoke-washers having toothed edges comprising coacting cutting and bending dies which sever the edges of the teeth from the blank and bend the same outwardly at right angles to the plane of said blank while leaving the margin of the washer connected with the blank between the teeth, and a second set of dies consisting of cutting-dies embracing an apertured die-plate and a punch which coacts with the plate to sever the finished washer from the blank between the teeth and also carries the finished washer through the die-plate and applies it to the rim and means for intermittingly feeding the blank to advance the same from the first to the second set of dies.

3. Dies for forming teeth on spoke-washers comprising a punch having annularly-arranged punching and bending prongs a die-plate and a die fitting in a hole in the plate, said die-plate being provided in its edges around said die with angular recesses in which are formed cutting edges which coact with the edges of the punching-prongs and the edges of the die together with the inner edges of the punching-prongs forming bending-surfaces.

4. Dies for forming marginal teeth on spoke-washers consisting of a punch provided with annularly-arranged prongs each having at its end two outer cutting edges at an angle with each other and an inner inwardly-facing bending edge, and a die provided with recesses to receive said prongs, said recesses having two outer angular cutting-faces and an inner, outwardly-facing bending edge corresponding with those on the prongs of the punch and recesses and prongs having adjacent parallel faces perpendicular to the faces of the die which faces are laterally separated to form spaces to receive the prongs.

5. The combination with dies for forming marginal teeth one of which is provided with cutting and bending prongs and the other with recesses having cutting edges which coact with said prongs to sever the washer from the blank along the edges of the teeth and bending-dies which coact with those on the prongs to bend the severed teeth at right angles to the plane of the blank, of cutting-dies consisting of an apertured die-plate and a plunger, said plate and plunger being made of such size as to sever the blank at the margin of the washer between the teeth thereof and the plunger being constructed to pass through the die-plate to apply the washer to the rim and a support for sustaining the rim opposite the punch and die which sever the finished washer from the blank.

In testimony that I claim the foregoing as my invention I affix my signature, in presence of two witnesses, this 21st day of April, A. D. 1897.

AXEL LEVEDAHL.

Witnesses:
C. CLARENCE POOLE,
WILLIAM L. HALL.